United States Patent
Chang et al.

(10) Patent No.: US 10,676,608 B2
(45) Date of Patent: Jun. 9, 2020

(54) PHOSPHORYLCHOLINE-CONTAINING POLY(METH)ACRYLAMIDE-BASED COPOLYMERS

(71) Applicant: Novartis AG, Basel (CH)

(72) Inventors: Frank Chang, Cumming, GA (US); Feng Jing, Snellville, GA (US); Troy Vernon Holland, Suwanee, GA (US); Chung-Yuan Chiang, Johns Creek, GA (US); John Dallas Pruitt, Suwanee, GA (US)

(73) Assignee: Alcon Inc., Fribourg (CH)

( * ) Notice: Subject to any disclaimer, the term of this patent is extended or adjusted under 35 U.S.C. 154(b) by 71 days.

(21) Appl. No.: 16/036,983

(22) Filed: Jul. 17, 2018

(65) Prior Publication Data

US 2019/0023891 A1 Jan. 24, 2019

Related U.S. Application Data

(60) Provisional application No. 62/533,776, filed on Jul. 18, 2017.

(51) Int. Cl.
| | | |
|---|---|---|
| *C08L 33/26* | (2006.01) | |
| *C08F 230/02* | (2006.01) | |
| *G02B 1/04* | (2006.01) | |
| *G02C 7/04* | (2006.01) | |
| *C08K 5/523* | (2006.01) | |
| *C08F 22/38* | (2006.01) | |

(52) U.S. Cl.
CPC ............ *C08L 33/26* (2013.01); *C08F 230/02* (2013.01); *C08K 5/523* (2013.01); *G02B 1/043* (2013.01); *G02C 7/04* (2013.01); *C08F 22/38* (2013.01); *C08F 2438/01* (2013.01); *C08F 2438/03* (2013.01); *C08L 2312/00* (2013.01)

(58) Field of Classification Search
CPC .... C08F 22/38; C08F 230/02; C08F 2438/01; C08F 2438/03; C08K 5/523; C08L 33/26; C08L 2312/00; G02C 7/04
See application file for complete search history.

(56) References Cited

U.S. PATENT DOCUMENTS

| | | | |
|---|---|---|---|
| 3,408,429 | A | 10/1968 | Wichterle |
| 4,347,198 | A | 8/1982 | Ohkada et al. |
| 5,508,317 | A | 4/1996 | Muller |
| 5,583,463 | A | 12/1996 | Merritt |
| 5,789,464 | A | 8/1998 | Muller |
| 5,849,810 | A | 12/1998 | Muller |
| 8,529,057 | B2 | 9/2013 | Qiu et al. |
| 9,127,099 | B2 | 9/2015 | Iwakiri et al. |
| 2013/0337160 | A1 | 12/2013 | Holland et al. |
| 2016/0061995 | A1 | 3/2016 | Chang et al. |

FOREIGN PATENT DOCUMENTS

| | | | |
|---|---|---|---|
| CN | 105670022 A | 6/2016 | |
| EP | 1465931 B1 | 8/2007 | |
| EP | 2638879 A2 | 9/2013 | |
| WO | WO-2010055914 A1 * | 5/2010 | ............ C08F 230/02 |

OTHER PUBLICATIONS

Sugiyama, et al. "Surface modified poly(methyl methacrylate) with 1-methyl-2-methacrylamidoethyl phosphorylcholine moiety", Macromol. Chem. Phys. 200, 1439-1445 (1999). (Year: 1999).*
WO2010055914 English machine translation via Google Patents prepared Nov. 21, 2019. (Year: 2019).*
Kazuo Sugiyama and Koji Ohga; "Surface modified poly(methyl methacrylate) with 1-methyl-2-methacrylamidoethyl phosphorylcholine moiety"; Macromol. Chem. Phys., vol. 200, No. 6, 1999, pp. 1439-1445.
Vertellus Biomaterials; "New PC Monomers for Ophthalmic Applications", Technical Data Sheet (VBTS007); v2; pp. 1-3; Sep. 2012.

* cited by examiner

*Primary Examiner* — Christopher M Rodd
(74) *Attorney, Agent, or Firm* — Jian Zhou

(57) ABSTRACT

The invention is related to a class of hydrophilic poly(meth) acrylamide-based copolymer comprising dangling (i.e., pendant) phosphorylcholine groups and dangling (i.e., pendant) reactive groups or chains each of which comprises one carboxyl group, one thiol group, or one primary or secondary amino group. The hydrophilic copolymers have a relatively high affinity to a base coating of a polyanionic polymer on a medical device or contact lens and are reactive towards azetidinium groups of an azetidinium-containing polymer upon heating. They can find particular use in producing water-soluble highly-branched hydrophilic polymeric material and in producing water gradient contact lenses.

15 Claims, No Drawings

PHOSPHORYLCHOLINE-CONTAINING POLY(METH)ACRYLAMIDE-BASED COPOLYMERS

This application claims the benefit under 35 USC § 119(e) of U.S. provisional application No. 62/533,776 filed 18 Jul. 2017, incorporated by reference in its entirety.

The present invention generally relates to a class of hydrophilic poly(meth)acrylamide-based copolymers comprising phosphorylcholine-containing pendant groups and pendant reactive groups, to a water-soluble, thermally-crosslinkable polymeric material comprising one or more such hydrophilic copolymers covalently attached thereto, and to uses thereof.

BACKGROUND

A new class of soft contact lenses, water gradient contact lenses, have been developed and successfully introduced in the market. This new class of contact lenses is characterized by having a water-gradient structural configuration, an increase from 33% to over 80% water content from core to surface. This unique design delivers a highly-lubricious and extremely-soft lens surface. Such soft contact lenses can be produced according to a cost-effective approach that is described in U.S. Pat. No. 8,529,057 and involves a step of crosslinking and covalently attaching of a water-soluble highly-branched hydrophilic polymeric material onto lens surfaces to form surface gels.

According to U.S. Pat. No. 8,529,057, contact lenses having a water-gradient structural configuration and a soft and lubricious surface can be produced by forming an anchoring layer on each contact lens by dipping the contact lenses in a coating solution of a polyanionic polymer and then covalently attaching a water-soluble highly-branched hydrophilic polymeric material onto the anchoring layer directly in a lens package during autoclave. The water-soluble highly-branched hydrophilic polymeric material is prepared by partially reacting a polyamidoamine-epichlorohydrin (PAE) with a wetting agent, at various concentration ratio of PAE to the wetting agent and at a reaction temperature for a given reaction time, to achieve a desired lubricity of the surface gels while minimizing or eliminating surface defects (e.g., surface cracking, etc.). Although this new approach can provide hydrogel contact lenses having a water-gradient structural configuration, its applicability and advantages can be limited by the limited availability of hydrophilic copolymers having a better biocompatibility and having a versatility and controllability in the levels of reactivity and/or contents of reactive functional group towards the azetidinium groups of PAE.

Therefore, there is still a need for reactive hydrophilic polymers having a desired biocompatibility and a desired level of reactivity and/or contents of reactive functional groups for producing water-soluble highly-branched hydrophilic polymeric material useful for producing water gradient contact lenses.

SUMMARY OF THE INVENTION

The invention, in one aspect, provides a poly(meth)acrylamide-based copolymer comprising first repeating units which are (meth)acrylamide repeating units each having one phosphorylcholine group and second repeating units which are acrylic repeating units each having a reactive pendant group or chain which comprises a carboxyl group, a thiol group, or an amino group of —NHR' in which R' is hydrogen or a $C_1$-$C_4$ alkyl group, wherein the poly(meth)acrylamide-based copolymer comprises at least 50% by mole of (meth)acrylamide repeating units relative to all repeating units of the poly(meth)acrylamide-based copolymer.

The invention, in another aspect, provides a water-soluble thermally-crosslinkable polymeric material, which comprises: (a) one or more first polymer chain of an azetidinium-containing polymer having azetidinium groups; (b) one or more second polymer chains of a hydrophilic poly(meth)acrylamide-based copolymer of the invention, wherein each second polymer chain is covalently attached to one of said one or more first polymer chains via at least one linkage formed between one azetidinium group of the azetidinium-containing polymer and one reactive pendant group or chain of the poly(meth)acrylamide-based copolymer; and (c) azetidinium groups each of which is embedded in or covalently attached to one of said one or more first polymer chains.

The invention, in a further aspect, provides a packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of the invention, wherein the packaging solution has a tonicity of from about 200 to about 450 milliosmol (mOsm) and a viscosity of from about 1 centipoise to about 20 centipoises at 25° C.

These and other aspects of the invention will become apparent from the following description of the presently preferred embodiments. The detailed description is merely illustrative of the invention and does not limit the scope of the invention, which is defined by the appended claims and equivalents thereof.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material. A person skilled in the art knows very well how to make contact lenses (either non-silicone hydrogel contact lenses or silicone hydrogel contact lenses). For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses.

A "soft contact lens" refers to a contact lens which has an elastic modulus (i.e., Young's modulus) of less than 2.5 MPa.

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.05% by weight at room temperature (i.e., a temperature of about 22° C. to about 28° C.). The term "water-soluble", in reference to a compound or material in water, means that the compound or material can be dissolved in water to give a solution with a concentration of at least about 0.05% by weight at room temperature The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C<group. Exemplary ethylenically unsaturated groups include without limitation (meth)acryloyl

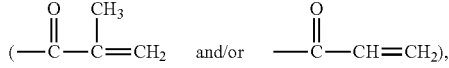

allyl, vinyl, styrenyl, or other C=C containing groups.

The term "(meth)acrylamide" refers to methacrylamide and/or acrylamide.

The term "(meth)acrylate" refers to methacrylate and/or acrylate.

The term "(meth)acrylamide monomer" refers to a vinylic monomer of

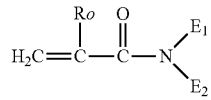

in which $R_o$ is hydrogen or methyl, $E_1$ and $E_2$ independent of each other are hydrogen or an organic radical having 1 to 50 carbon atoms.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

In this application, a "poly(meth)acrylamide-based copolymer" refers to a copolymer comprising more than 50% (preferably at least 55%, more preferably at least 60%, even more preferably at least 70%, most preferably at least 80%) by mole of repeating units which are (meth)acrylamide repeating units relative to all repeating units of the copolymer.

In this application, a "poly(meth)acrylate-based copolymer" refers to a copolymer comprising more than 50% (preferably at least 55%, more preferably at least 60%, even more preferably at least 70%, most preferably at least 80%) by mole of repeating units which are (meth)acrylate repeating units relative to all repeating units of the copolymer.

In this application, "(meth)acrylamide repeating units" refers to a class of repeating units (i.e., divalent radicals) which are linked together successively with each other and optionally other kinds of repeating units to form a polymeric chain of a polymer, wherein each of the (meth)acrylamide repeating units has a structural formula of

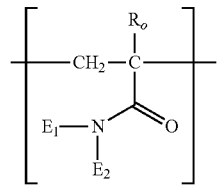

in which $R_o$ is hydrogen or methyl, $E_1$ and $E_2$ independent of each other are hydrogen or an organic radical having 1 to 50 carbon atoms.

In this application, "(meth)acrylate repeating units" refers to a class of repeating units (i.e., divalent radicals) which are linked together successively with each other and optionally other kinds of repeating units to form a polymeric chain of the polymer, wherein each of the (meth)acrylate repeating units has a structural formula of

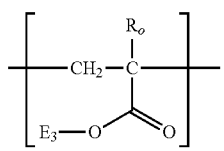

in which $R_o$ is hydrogen or methyl, $E_3$ is hydrogen or an organic radical having 1 to 50 carbon atoms.

In this application, "acrylic repeating units" refers to (meth)acrylamide repeating units and/or (meth)acrylate repeating units.

A "macromer" or "prepolymer" refers to a compound or polymer that contains ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ alkanoylamino, $C_1$-$C_4$ alkylamino, di-$C_1$-$C_4$ alkylamino, halogen atom (Br or Cl), and combinations thereof.

In this application the term "azetidinium" or "3-hydroxyazetidinium" refers to a positively-charged, divalent radical (or group or moiety) of

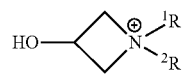

in which $^1R$ and $^2R$ are a hydrocarbon group.

The term "azlactone" refers to a mono-valent radical of formula

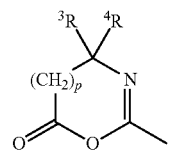

in which p is 0 or 1; $^3R$ and $^4R$ independently of each other is $C_1$-$C_8$ alkyl (preferably methyl).

As used in this application, the term "phosphorylcholine" or "PC" interchangeably refers to a monovalent zwitterionic group of

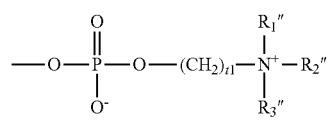

in which t1 is an integer of 1 to 5 and $R_1''$, $R_2''$ and $R_3''$ independently of one another are $C_1$-$C_8$ alkyl or $C_1$-$C_8$ hydroxyalkyl.

In this application, an "oxazoline" refers to a compound of

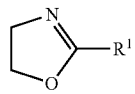

in which $R^1$ is hydrogen, $C_1$-$C_{18}$ alkyl, $C_1$-$C_4$ alkyl-substituted phenyl, $C_1$-$C_4$-alkoxy-substituted phenyl, $C_6$-$C_{18}$ aryl radical, N-pyrrolidonyl-$C_1$-$C_4$ alkyl, a monovalent radical of -alk-$(OC_2H_4)_{m3}$—OR" (in which alk is $C_1$-$C_4$ alkyl diradical, R" is $C_1$-$C_4$ alkyl, preferably methyl, and m3 is an integer from 1 to 10 (preferably 1 to 5)), preferably $R^1$ is methyl, ethyl, propyl, N-pyrrolidonyl-$C_1$-$C_4$ alkyl, a monovalent radical of -alk-$(OC_2H_4)_{m3}$—OR" (in which alk is $C_1$-$C_4$ alkyl diradical, R" is $C_1$-$C_4$ alkyl, preferably methyl, and m3 is an integer from 1 to 10 (preferably 1 to 5)).

In this application, the term "polyoxazoline" refers to a linear polymer having a formula of

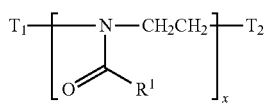

in which: $T_1$ and $T_2$ are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

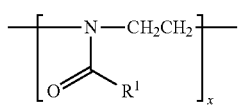

in which R¹ and x are as defined above.

In this application, the term "poly(2-oxazoline-co-ethyleneimine)" refers to a statistical copolymer having a formula of

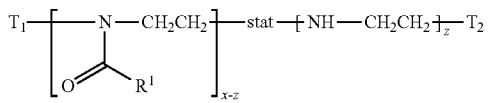

in which: $T_1$ and $T_2$ are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (>90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a desired number of cycles of manual rubbing.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 50% (preferably at least about 60%, more preferably at least about 80%, even more preferably at least about 90%, in particular at least about 95%) by weight of water and at most 50% (preferably about 40% or less, more preferably about 20% or less, even more preferably about 10% or less, in particular about 5% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 49%, preferably about 40% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

An "in-package-crosslinking process" or "IPC process" refers to a crosslinking reaction carried out in-situ directly in a packaging solution in a package (which is for storing and sterilizing a contact lens or a medical device) during autoclave. Examples of such processes are described in U.S. Pat. No. 8,529,057. A non-silicone hydrogel coating can be formed on a medical device or a contact lens.

The invention is generally related to a class of hydrophilic poly(meth)acrylamide-based copolymers having pendant phosphorylcholine (PC) groups and pendant reactive groups (carboxyl, thiol primary amino, secondary amino, or combinations thereof). It is discovered that a PC-containing poly(meth)acrylamide-based copolymer of the invention can have a much higher affinity to a base coating of a polyanionic polymer (e.g., polyacrylic acid, "PAA", or polymethacrylic acid, "PMAA") than a PC-containing hydrophilic poly(meth)acrylate-based copolymer polymer (e.g., Lipidure® which is a copolymer of a PC-containing (meth)acrylate and a (meth)acrylate having a carboxyl or amino group), when being used in preparing a water-soluble thermally crosslinkable hydrophilic polymeric material (i.e., an IPC material) for producing water gradient contact lenses. Because of a high affinity to a base coating, such a water-soluble thermally crosslinkable hydrophilic polymeric material can be more efficiently attached onto the based coating, so as to efficiently produce water gradient contact lenses.

While not wishing to be bound by any theory, the inventors believe that there exists a hybrid of two forms, known as resonance structures, for each amide bond. As shown below, the double-headed arrow indicates that the true electronic structure of the bonding would lie somewhere between the extremes of an apolar (form A) and a dipolar form (form B). The electrons would be spread out between the nitrogen, carbon and oxygen atoms. This electron delocalization, which polarizes the amide bond, may enhance the affinity and even complexation between an IPC material and a base coating of PAA or PMAA on a lens surface.

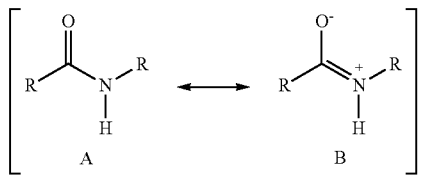

By having pendant PC groups, a hydrophilic poly(Meth)acrylamide-based copolymer of the invention can provide a coating on a contact lens or a medical device with an improved biocompatibility compared to a hydrophilic polymer free of PC groups.

The invention, in one aspect, provides a poly(meth)acrylamide-based copolymer that comprises: first repeating units each of which is a (meth)acrylamide repeating unit of formula (1)

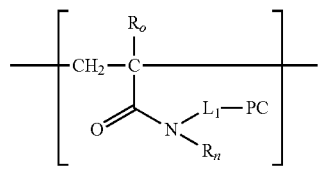
(1)

in which $R_o$ is hydrogen or methyl, $R_n$ is hydrogen or a $C_1$-$C_4$ alkyl group, $L_1$ is a $C_2$-$C_4$ alkylene divalent radical, PC is a monovalent radical of

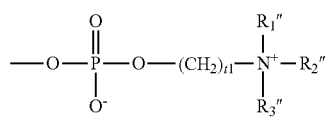

in which t1 is an integer of 1 to 5 and $R_1''$, $R_2''$ and $R_3''$ independently of one another are $C_1$-$C_4$ alkyl or $C_1$-$C_4$ hydroxyalkyl; and second repeating units which are acrylic repeating units each having a reactive pendant group or chain which comprises a carboxyl group, a thiol group, or an amino group of —NHR' in which R' is hydrogen or a $C_1$-$C_4$ alkyl group, wherein the poly(meth)acrylamide-based copolymer comprises at least 50% (preferably at least 55%, more preferably at least 60%, even more preferably at least 70%, most preferably at least 80%) by mole of all (meth)acrylamide repeating units relative to all repeating units of the poly(meth)acrylamide-based copolymer. It is understood that a poly(meth)acrylamide-based copolymer of the invention must comprises more than 50% by mole or the specified mole percentage of all (meth)acrylamide repeating units which must include the first repeating units and also can include the second repeating units and other repeating units not listed above if necessary for reaching or passing the specified mole percentage.

In a preferred embodiment, a poly(meth)acrylamide-based copolymer of the invention comprises at least about 50% by mole, preferably from about 50% to about 98% by mole, more preferably from about 60% to about 95% by mole, even more preferably from about 70% to about 90% by mole of the first repeating units.

In another preferred embodiment, a poly(meth)acrylamide-based copolymer of the invention comprises from about 0.01% to about 40% by mole, preferably from about 0.1% to about 30%, more preferably from about 0.5% to about 20%, even more preferably from about 1% to about 10%, by mole of the second repeating units relative to all repeating units of the poly(meth)acrylamide-based copolymer.

Preferably, the second repeating units comprises at least one repeating unit of any one of formula (2) to (11)

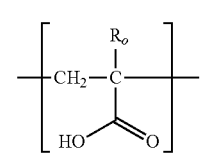
(2)

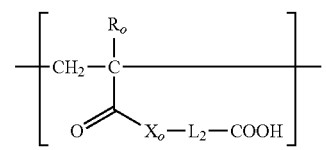
(3)

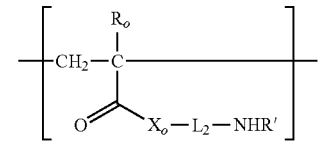
(4)

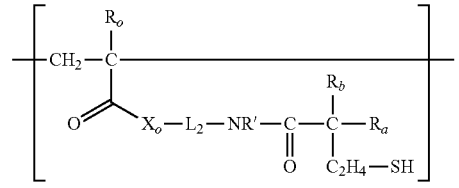
(5)

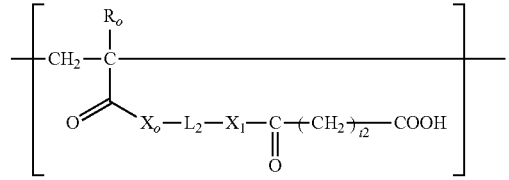
(6)

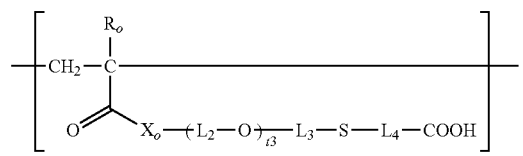
(7)

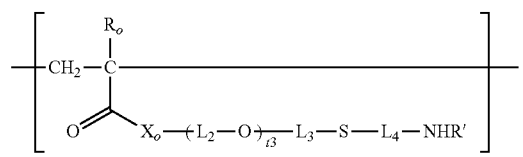
(8)

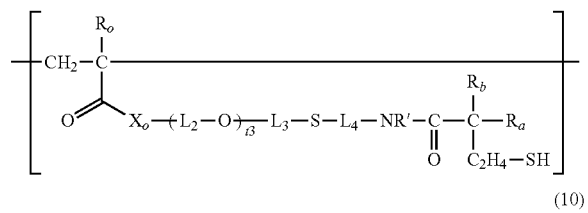
(9)

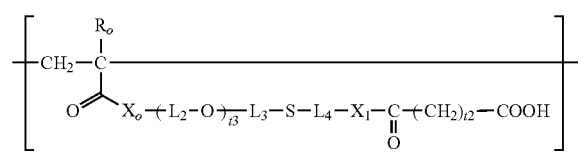
(10)

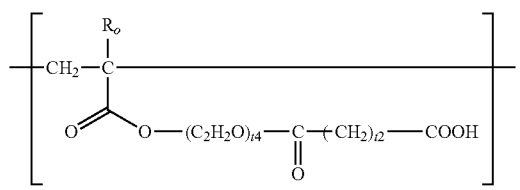
(11)

in which $R_o$ is hydrogen or methyl, $X_o$ and $X_1$ independent of each other are —O— or preferably —$NR_n$— in which $R_n$ is hydrogen or a $C_1$-$C_4$ alkyl group, $L_2$ and $L_4$ independent of each other are a $C_2$-$C_4$ alkylene divalent radical having 0 or 1 hydroxyl group, $L_3$ is —$CH_2$—CHOH—$CH_2$—, R' is hydrogen or a $C_1$-$C_4$ alkyl group (preferably hydrogen or methyl, more preferably hydrogen), $R_a$ is hydrogen or methyl, and $R_b$ is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino), t2 is an integer of 2 to 4, t3 and t4 independent of each other are 0 or 1.

A poly(meth)acrylamide-based copolymer of the invention, which comprises (meth)acrylamide repeating units of formula (1) and acrylic repeating units of formula (2) can be obtained by polymerizing a polymerizable composition including at least one PC-containing (meth)acrylamide monomer of formula (12), (meth)acrylic acid, and other necessary polymerizable components according to any suitable free radical polymerization technique well known to a person skilled in the art,

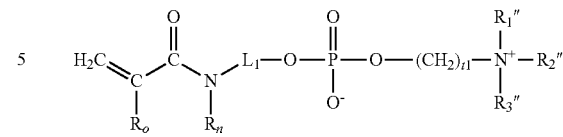
(12)

in which t1 is an integer of 1 to 5, $R_o$ is hydrogen or methyl, $R_n$ is hydrogen or a $C_1$-$C_4$ alkyl group, $L_1$ is a $C_2$-$C_6$ alkylene divalent radical, and $R_1''$, $R_2''$ and $R_3''$ independently of one another are $C_1$-$C_4$ alkyl or $C_1$-$C_4$ hydroxyalkyl.

Examples of well-known free-radical polymerization techniques include without limitation thermal polymerization in the presence of thermal initiator, light-induced polymerization in the presence of photoinitiator, atom-transfer-radical polymerization (ATRP) in the presence of an ATRP initiator, radical-addition-fragmentation-transfer (RAFT) polymerization in the presence of a RAFT agent. A person skilled in the art knows that a chain-transfer agent (i.e., a mercaptane compound can be added in a polymerizable composition for controlling the molecular weight of resultant copolymers.

A PC-containing (meth)acrylamide monomer of formula (12) can be obtained from commercial sources (e.g., Vertellus). Alternatively, it can be prepared according to any method known to a person skilled in the art. For example, a vinylic monomer of formula (1) can be prepared by reacting a hydroxyalkyl (meth)acrylamide with a 2-chloro-2-oxo-1,3,2-dioxaphospholane (available from Sigma-Aldrich) in the presence of a base (e.g., triethylamine) in an inert solvent (e.g., tetrahydrofuran) at a low temperature (e.g., about −30° C.) to obtain a 2-(meth)acrylamidoalkyl-2-oxo-1,3,2-dioxaphospholane and then reacting 2-(meth)acrylamidoalkyl-2-oxo-1,3,2-dioxaphospholane with trimethylamine at a relatively higher temperature (e.g., about 60° C.) as described by Sugiyama and Ohga in Macromol. Chem. Phy. 200, 1439-1445 (1999) and illustrated in Scheme I.

Scheme I

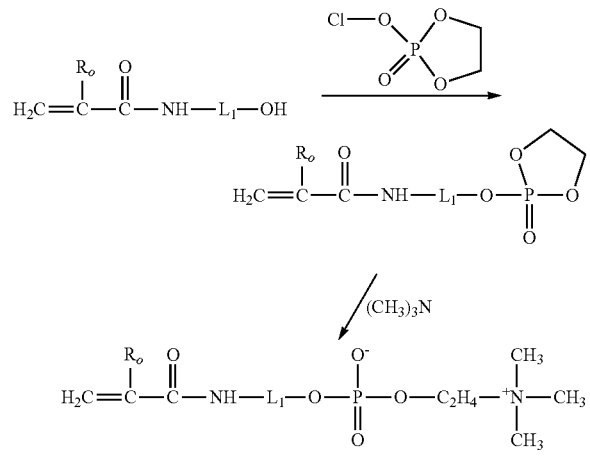

Any hydroxyalkyl (meth)acrylamides can be used in the preparation of a PC-containing (meth)acrylamide of formula (1). Examples of hydroxyalkyl (meth)acrylamide include without limitation N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide. Hydroxyalkyl (meth)acrylamides can be obtained from the commercial sources.

A poly(meth)acrylamide-based copolymer of the invention, which comprises (meth)acrylamide repeating units of formula (1) and acrylic repeating units of formula (3) in which $X_o$ is —O—, can be obtained by polymerizing a polymerizable composition including at least one PC-containing (meth)acrylamide monomer of formula (12) (described above), at least one carboxyl-containing (meth)acrylate monomer, and other necessary polymerizable components according to any suitable free radical polymerization technique well known to a person skilled in the art.

Examples of preferred carboxyl-containing (meth)acrylate monomers include without limitation 3-[(meth)acryloyloxy]propanoic acid, 2-hydroxy-3-[(meth)acryloyloxy]propanoic acid, 3-[(meth)acryloyloxy]-2,2-dimethylpropanoic acid, and 4-[(meth)acryloyloxy]butanoic acid.

A poly(meth)acrylamide-based copolymer of the invention, which comprises (meth)acrylamide repeating units of formula (1) and acrylic repeating units of formula (3) in which $X_o$ is —$NR_n$— in which $R_n$ is hydrogen or a $C_1$-$C_4$ alkyl, can be obtained by polymerizing a polymerizable composition including at least one PC-containing (meth)acrylamide monomer of formula (12) (described above), at least one carboxyl-containing (meth)acrylamide monomer, and other necessary polymerizable components according to any suitable free radical polymerization technique well known to a person skilled in the art.

Examples of preferred carboxyl-containing (meth)acrylamide monomers include without limitation 2-(meth)acrylamidoacetic acid, 2-(meth)acrylamide glycolic acid, 3-(meth)acrylamidopropionic acid, 4-(meth)acrylamidobutanoic acid, 5-(meth)acrylamidopentanoic acid, 3-(meth)acrylamide-3-methylbutanoic acid.

A poly(meth)acrylamide-based copolymer of the invention, which comprises (meth)acrylamide repeating units of formula (1) and acrylic repeating units of formula (4) in which $X_o$ is —O—, can be obtained by polymerizing a polymerizable composition including at least one PC-containing (meth)acrylamide monomer of formula (12) (described above), at least one (meth)acrylate monomer having an amino group of —NHR', and other necessary polymerizable components according to any suitable free radical polymerization technique well known to a person skilled in the art.

Examples of (meth)acrylate monomers having an amino group of —NHR' include without limitation amino-$C_1$-$C_4$ alkyl (meth)acrylates (e.g., 2-aminoethyl (meth)acrylate, 3-aminopropyl (meth)acrylate, 3-amino-2-hydroxypropyl (meth)acrylate, 4-aminobutyl (meth)acrylate, etc.), $C_1$-$C_4$ alkylamino-$C_2$-$C_4$ alkyl (meth)acrylates.

A poly(meth)acrylamide-based copolymer of the invention, which comprises (meth)acrylamide repeating units of formula (1) and acrylic repeating units of formula (4) in which $X_o$ is —$NR_n$— in which $R_n$ is hydrogen or a $C_1$-$C_4$ alkyl, can be obtained by polymerizing a polymerizable composition including at least one PC-containing (meth)acrylamide monomer of formula (12) (described above), at least one (meth)acrylamide monomer having an amino group of —NHR', and other necessary polymerizable components according to any suitable free radical polymerization technique well known to a person skilled in the art.

Examples of (meth)acrylamide monomers having an amino group of —NHR' include without limitation N—$C_2$-$C_4$ aminoalkyl (meth)acrylamides (e.g., N-2-aminoethyl (meth)acrylamide, N-3-aminopropyl (meth)acrylamide, etc.), N—$C_1$-$C_4$ alkylamino-$C_2$-$C_4$ alkyl (meth)acrylamides.

A poly(meth)acrylamide-based copolymer of the invention, which comprises (meth)acrylamide repeating units of formula (1) and acrylic repeating units of formula (5) in which $X_o$ is —O— can be obtained by reacting a thiolactone with a copolymer comprising (meth)acrylamide repeating units of formula (1) and acrylic repeating units of formula (4) in which $X_o$ is —O— (as described above), to convert the amino pedant groups of the acrylic repeating units into thiol-containing pendant chains, as illustrated in Scheme II.

Scheme II

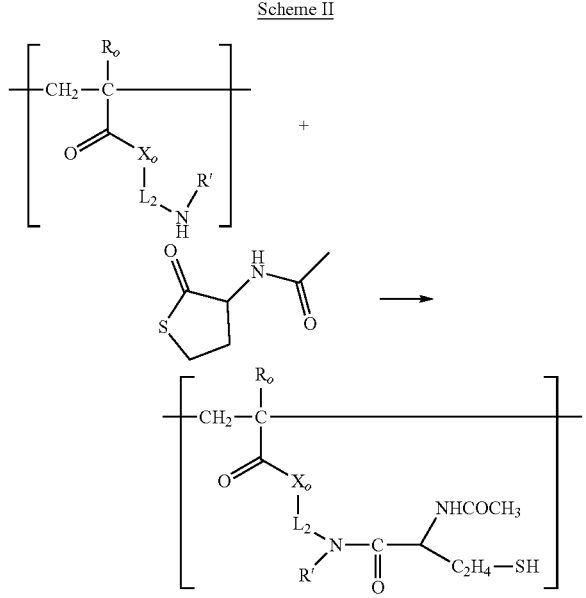

Examples of preferred thiolactone include without limitation N-acetyl homocysteine thiolactone, 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxybutyryl homocysteine thiolactone (or 4-oxo-4-[(tetrahydro-2-oxo-3-thienyl)amino]-butanoic acid).

A poly(meth)acrylamide-based copolymer of the invention, which comprises (meth)acrylamide repeating units of formula (1) and acrylic repeating units of formula (5) in which $X_o$ is —$NR_n$— in which $R_n$ is hydrogen or a $C_1$-$C_4$ alkyl, can be obtained by reacting a thiolactone (any one of those described above) with a copolymer comprising (meth)acrylamide repeating units of formula (1) and acrylic repeating units of formula (4) in which $X_o$ is —$NR_n$— in which $R_n$ is hydrogen or a $C_1$-$C_4$ alkyl (as described above), to convert the amino pedant groups of the acrylic repeating units into thiol-containing pendant chains.

A poly(meth)acrylamide-based copolymer, which comprises (meth)acrylamide repeating units of formula (1) and acrylic repeating units of formula (5), have pendant chains each of which is terminated with a thiol group and can be highly reactive with the azetidinium groups of an azetidinium-containing polymer compared to an amino group.

When being used together with an azetidinium-containing polymer in forming a hydrogel coating on a contact lens or medical device, the resultant hydrogel would have loosely-crosslinked 3-dimensional polymer networks because of the relatively long length of the crosslinkages each formed between one azetidinium group and one thiol-containing pendant chain of one acrylic repeating unit.

A poly(meth)acrylamide-based copolymer of the invention, which comprises (meth)acrylamide repeating units of formula (1) and acrylic repeating units of formula (6) in which $X_o$ is —O—, can be obtained by reacting a di-carboxylic acid anhydride (e.g., succinic acid anhydride, glutaric acid anhydride, adipic acid anhydride, or combination thereof) with a copolymer comprising (meth)acrylamide repeating units of formula (1) and acrylic repeating units of formula (4) in which $X_o$ is —O— (as described above) to convert the amino pedant groups of the acrylic repeating units into carboxyl-containing pendant chains, or alternatively by reacting a di-carboxylic acid anhydride with a copolymer comprising (meth)acrylamide repeating units of formula (1) and (meth)acrylate repeating units of at least one $C_2$-$C_4$ hydroxyalkyl (meth)acrylate to convert the hydroxyl pendant groups of the (meth)acrylate repeating units.

A poly(meth)acrylamide-based copolymer of the invention, which comprises (meth)acrylamide repeating units of formula (1) and acrylic repeating units of formula (6) in which $X_o$ is —$NR_n$— in which $R_n$ is hydrogen or a $C_1$-$C_4$ alkyl, can be obtained by reacting a di-carboxylic acid anhydride (e.g., succinic acid anhydride, glutaric acid anhydride, adipic acid anhydride, or combination thereof) with a copolymer comprising (meth)acrylamide repeating units of formula (1) and acrylic repeating units of formula (4) in which $X_o$ is —$NR_n$— in which $R_n$ is hydrogen or a $C_1$-$C_4$ alkyl (as described above) to convert the amino pedant groups of the acrylic repeating units into carboxyl-containing pendant chains, or alternatively by reacting a di-carboxylic acid anhydride with a copolymer comprising (meth)acrylamide repeating units of formula (1) and (meth)acrylamide repeating units of at least one $C_2$-$C_4$ hydroxyalkyl (meth)acrylamide to convert the hydroxyl pendant groups of the (meth)acrylamide repeating units.

A poly(meth)acrylamide-based copolymer, which comprises (meth)acrylamide repeating units of formula (1) and acrylic repeating units of formula (6), have pendant chains each of which is terminated with a carboxyl group and can be highly reactive with the azetidinium groups of an azetidinium-containing polymer compared to an amino group. When being used together with an azetidinium-containing polymer in forming a hydrogel coating on a contact lens or medical device, the resultant hydrogel would have loosely-crosslinked 3-dimensional polymer networks because of the relatively long length of the crosslinkages each formed between one azetidinium group and one carboxyl-containing pendant chain of one acrylic repeating unit.

A poly(meth)acrylamide-based copolymer of the invention, which comprises (meth)acrylamide repeating units of formula (1) and acrylic repeating units of formula (7), can be obtained in a two-step process. In the first step, an intermediary copolymer is obtained by polymerizing a polymerizable composition including at least one PC-containing (meth)acrylamide monomer of formula (12) (described above), at least one acrylic monomer having an epoxy group, and other necessary polymerizable components according to any suitable free radical polymerization technique well known to a person skilled in the art. In the second step, the intermediary copolymer is reacted with a carboxyl-containing mercaptane to obtained the desired poly(meth) acrylamide-based copolymer similar to a procedure described in U.S. Pat. No. 9,127,099 (herein incorporated in reference in its entirety).

Examples of preferred epoxy-containing acrylic monomers includes without limitation glycidyl (meth)acrylamide, hydroxylethyl (meth)acrylamide glycidyl ether, 3-hydroxypropyl (meth)acrylamide glycidyl ether, 4-hydroxybutyl (meth)acrylamide glycidyl ether, glycidyl (meth)acrylate, hydroxylethyl (meth)acrylate glycidyl ether, 3-hydroxypropyl (meth)acrylate glycidyl ether, 4-hydroxybutyl (meth) acrylate glycidyl ether.

Examples of preferred carboxyl-containing mercaptanes include without limitation 2-mercaptopropionic acid, 3-mercaptopropionic acid, 4-mercaptobutyric acid, 2-mercaptobutanoic acid, mercaptoacetic acid (i.e., thioglycolic acid).

A poly(meth)acrylamide-based copolymer of the invention, which comprises (meth)acrylamide repeating units of formula (1) and acrylic repeating units of formula (8), can be obtained in a two-step process. In the first step, an intermediary copolymer is obtained by polymerizing a polymerizable composition including at least one PC-containing (meth)acrylamide monomer of formula (12) (described above), at least one acrylic monomer having an epoxy group, and other necessary polymerizable components according to any suitable free radical polymerization technique well known to a person skilled in the art. In the second step, the intermediary copolymer is reacted with an amino-containing mercaptane to obtained the desired poly(meth) acrylamide-based copolymer similar to a procedure described in U.S. Pat. No. 9,127,099.

Examples of preferred amino-containing mercaptanes include without limitation aminoethanethiol, 3-amino-1-propanethiol, 4-amino-1-butanethiol, 3-amino-2-butanethiol, 3-amino-2-methyl-2-propanethiol, 1-amino-2-propanethiol.

A poly(meth)acrylamide-based copolymer of the invention, which comprises (meth)acrylamide repeating units of formula (1) and acrylic repeating units of formula (9), can be obtained by reacting a thiolactone (e.g., any one of those described above) with poly(meth)acrylamide-based copolymer comprising (meth)acrylamide repeating units of formula (1) and acrylic repeating units of formula (8) to convert the amino pedant groups of the acrylic repeating units into thiol-containing pendant chains.

A poly(meth)acrylamide-based copolymer of the invention, which comprises (meth)acrylamide repeating units of formula (1) and acrylic repeating units of formula (10), can be obtained by reacting a di-carboxylic acid anhydride (e.g., any one of those described above) with poly(meth)acrylamide-based copolymer comprising (meth)acrylamide repeating units of formula (1) and acrylic repeating units of formula (8) to convert the amino pedant groups of the acrylic repeating units into carboxyl-containing pendant chains.

A poly(meth)acrylamide-based copolymer of the invention, which comprises (meth)acrylamide repeating units of formula (1) and acrylic repeating units of formula (10), can be obtained in a two-step process. In the first step, diethylene glycol mono-(meth)acrylate or polyethylene glycol mono-(meth)acthacrylate is reacted with a dicarboxylic acid anhydride (e.g., succinic acid anhydride, glutaric acid anhydride, adipic acid anhydride, or combination thereof) under coupling reaction conditions to obtain an acrylic monomer having a chain terminated with a carboxyl group. In the second step, the obtained acrylic monomer and at least one (meth)acrylamide monomer of formula (12) as well as other necessary polymerizable components are polymerized according to any suitable free radical polymerization technique well known to a person skilled in the art to obtain the desired poly(meth)acrylamide-based copolymer of the invention.

In accordance with the invention, the poly(meth)acrylamide-based copolymer can further comprises third repeating units which are acrylic repeating units of one or more acrylic monomers which are free of any carboxyl group or any primary or secondary amino group. The third repeating units are preferably selected from the group consisting of (meth)acryloyloxyethyl phosphorylcholine (aka, MPC, or 2-(meth)acryloyloxy)ethyl-2'-(trimethylammonio)ethylphosphate), (meth)acryloyloxypropyl phosphorylcholine (aka, 3-((meth)acryloyloxy) propyl-2'-(trimethylammonio)ethylphosphate), 4-((meth)acryloyloxy)butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, 2-hydroxyethyl (meth)acrylate, glycerol (meth)acrylate, 3-hydroxypropyl (meth)acrylate, 2-hydroxypropyl (meth)acrylate, $C_1$-$C_4$-alkoxy polyethylene glycol (meth)acrylate having a weight average molecular weight of up to 1500 Daltons, N,N-dimethylaminoethyl (meth)acrylate, N-vinylpyrrolidone (NVP), N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, allyl alcohol, vinyl alcohol, and combinations thereof, more preferably selected from the group consisting of 2-(meth)acryloyloxy)ethyl-2'-(trimethylammonio)ethylphosphate, 3-((meth)acryloyloxy) propyl-2'-(trimethylammonio)ethylphosphate, 4-((meth)acryloyloxy)butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosposphate, 2-((meth)acryloyloxy)pentyl-2'-(trimethylammonio)ethylphosphate, 2-((meth)acryloyloxy)hexyl-2'-(trimethylammonio)ethyl phosphate, (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, 2-hydroxyethyl (meth)acrylate, glycerol (meth)acrylate, hydroxypropyl (meth)acrylate, $C_1$-$C_4$-alkoxy polyethylene glycol (meth)acrylate having a weight average molecular weight of up to 1500 Daltons, and combinations thereof, even more preferably from the group consisting of (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, and combinations thereof.

In accordance with the invention, a hydrophilic poly(meth)acrylamide-based copolymer of the invention has a weight average molecular weight of from about 500 to about 2,000,000, preferably from about 1,000 to about 1,000,000, more preferably from about 2,000 to about 500,000 Daltons.

A hydrophilic poly(meth)acrylamide-based copolymer of the invention can find particular use in forming a water-soluble and thermally crosslinkable hydrophilic polymeric material containing azetidinium groups. Such a water-soluble and thermally crosslinkable hydrophilic polymeric material can be obtained by partially reacting a hydrophilic poly(meth)acrylamide-based copolymer with an azetidinium-containing polymer according to procedures similar to what described in U.S. Pat. No. 8,529,057 and can be especially useful for producing water gradient contact lenses. One azetidinium group of an azetidinium-containing polymer can react with one thiol group of a hydrophilic polymer of the invention according to the following reaction

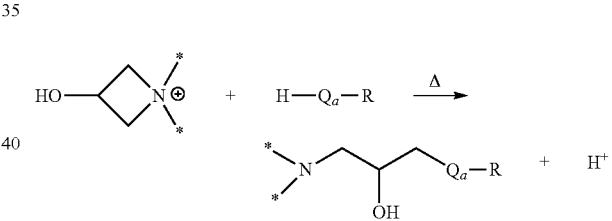

in which $Q_a$ is —OCO—, —S— or —NR'— in which R' is hydrogen or a $C_1$-$C_4$ alkyl, R is an organic radical.

The invention, in another aspect, provides a water-soluble thermally-crosslinkable polymeric material, which comprises (a) one or more first polymer chain of an azetidinium-containing polymer having azetidinium groups, (b) one or more second polymer chains of a hydrophilic poly(meth)acrylamide-based copolymer of the invention (any one of those described above), wherein each second polymer chain is covalently attached to one of said one or more first polymer chains via at least one linkage formed between one azetidinium group of the azetidinium-containing polymer and one reactive pendant group or chain of the poly(meth)acrylamide-based copolymer; and (c) azetidinium groups each of which is embedded in or covalently attached to one of said one or more first polymer chains.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931. A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. 2016/0061995 A1.

Homopolymers and copolymers of an azetidinium-containing vinylic monomer can be obtained according to the procedures described in U.S. Pat. Appl. Pub. No. 2013/0337160A1.

Water-soluble and thermally-crosslinkable hydrophilic polymeric materials can be prepared according to the processes disclosed in U.S. Pat. Appli. Pub. Nos. US 2016/0061995 A1 and US2013/0337160 A1 and in U.S. Pat. No. 8,529,057.

In a preferred embodiment, a water-soluble thermally-crosslinkable polymeric material can be obtained by heating an aqueous reactive solution, which comprises at least one azetidinium-containing polymer and at least one hydrophilic poly(meth)acrylamide-based copolymer of the invention (any one described above), to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilic polymer. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a reactive hydrophilic poly(meth)acrylamide-based copolymer relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilic poly(meth)acrylamide-based copolymer of the invention, the concentration ratio of the azetidinium-containing polymer to the poly(meth)acrylamide-based copolymer of the invention is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of second polymer chains derived from at least one poly(meth)acrylamide-based copolymer of the invention, wherein the second polymer chains are covalently attached to the first polymer chains through one or more covalent linkages each formed between one azetidinium group of the polyamidoamine-epichlorohydrin or the poly(2-oxazoline-co-ethyleneimine)-epichlorohydrin and one carboxyl, thiol or amino group of the poly(meth)acrylamide-based copolymer of the invention, and (iii) azetidinium groups which are parts of the first polymer chains or pendant or terminal groups covalently attached to the first polymer chains. The composition of the water-soluble thermally-crosslinkable polymeric material is determined by the composition (based on the total weight of the reactants) of a reactant mixture used for such a polymer. For example, if a reactant mixture comprises about 75% by weight of a polyamidoamine-epichlorohydrin and about 25% by weight of at least one poly(meth)acrylamide-based copolymer of the invention based on the total weight of the reactants (excluding solvent), then the resultant water-soluble thermally-crosslinkable polymeric material comprises about 75% by weight of first polymer chains derived from the polyamidoamine-epichlorohydrin and about 25% by weight of second polymer chains derived from said at least one poly(meth)acrylamide-based copolymer of the invention.

A water-soluble thermally-crosslinkable polymeric material produced according to a method of the invention can find particular use in preparing a packaging solution used for packaging and autoclaving medical devices, especially contact lenses. Such a packaging solution is especially suitable for forming a relatively-thick and soft hydrogel coatings on hydrogel contact lenses or medical devices according to the in-package-crosslinking (IPC) processes described in U.S. Pat. No. 8,529,057. The resultant hydrogel coatings can have a superior lubricity (a friction rating of 0) with minimized or no surface cracking.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and autoclaved (a sterilization procedure involving heating the packaging of a contact lens to a temperature of from about 118° C. to about 125° C. for approximately 20-40 minutes under pressure) prior to dispensing to users. A person skilled in the art will understand well how to seal and autoclave lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., polyethylene glycol, cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of 6.5 to 7.5. Any known, physiologically compatible buffering agents can be used. Suitable buffering agents as a constituent of the contact lens care composition according to the invention are known to the person skilled in the art. Examples are borate buffers, citrate buffers, bicarbonate buffers, phosphate buffers, TRIS (2-amino-2-hydroxymethyl-1,3-propanediol), Bis-Tris (Bis-(2-hydroxyethyl)-imino-tris-(hydroxymethyl)-methane), Bis-Tris-propane (1,3-bis(tris(hydroxymethyl)methylamino)propane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof. Preferably, the buffering agents are phosphate buffers, borate buffers, or combinations thereof. The amount of each buffer agent in a packaging solution is preferably from 0.01% to 0.8%; most preferably from about 0.02% to about 0.4% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

The packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material of the invention.

In accordance with the invention, during autoclave, a water-soluble thermally-crosslinkable polymeric material of the invention can be crosslinked effectively with the functional groups (e.g., amino groups, thiol groups, and/or carboxylic acid groups) on and/or near the surface of a hydrogel contact lens (or a medical device) to form a crosslinked hydrogel coating which are wettable and ophthalmically compatible, while those azetidinium groups which do not participate in crosslinking reaction may be hydrolyzed into 2,3-dihydroxypropyl ($HO-CH_2-CH(OH)-CH_2-$) groups. After autoclave, the water-soluble thermally-crosslinkable polymeric material present in the lens packaging solution, if applicable, would have been converted to a non-reactive polymeric wetting agent capable of improving a lens's insert comfort.

The invention, in a further aspect, provides a packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of the invention (any one of those described above), wherein the packaging solution has a tonicity of from about 200 to about 450 milliosmol (mOsm) and a viscosity of from about 1 centipoise to about 20 centipoises at 25° C.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A poly(meth)acrylamide-based copolymer comprising: first repeating units each of which is a (meth)acrylamide repeating unit of formula (1)

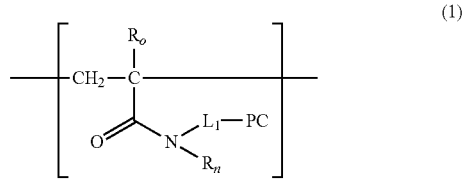

in which $R_o$ is hydrogen or methyl, $R_n$ is hydrogen or a $C_1$-$C_4$ alkyl group, $L_1$ is a $C_2$-$C_4$ alkylene divalent radical, PC is a monovalent radical of

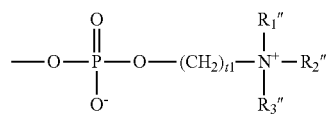

in which t1 is an integer of 1 to 5 and $R_1''$, $R_2''$ and $R_3''$ independently of one another are $C_1$-$C_4$ alkyl or $C_1$-$C_4$ hydroxyalkyl; and second repeating units which are acrylic repeating units each having a reactive pendant group or chain which comprises a carboxyl group, a thiol group or an amino group of —NHR' in which R' is hydrogen or a $C_1$-$C_4$ alkyl group, wherein the poly(meth)acrylamide-based copolymer comprises at least 50% by mole of all (meth)acrylamide repeating units relative to all repeating units of the poly(meth)acrylamide-based copolymer.

2. The hydrophilic polymer of invention 1, wherein the poly(meth)acrylamide-based copolymer comprises at least 55% by mole of all (meth)acrylamide repeating units relative to all repeating units of the poly(meth)acrylamide-based copolymer.

3. The hydrophilic polymer of invention 1, wherein the poly(meth)acrylamide-based copolymer comprises at least 60% by mole of all (meth)acrylamide repeating units relative to all repeating units of the poly(meth)acrylamide-based copolymer.

4. The hydrophilic polymer of invention 1, wherein the poly(meth)acrylamide-based copolymer comprises at least 70% by mole of all (meth)acrylamide repeating units relative to all repeating units of the poly(meth)acrylamide-based copolymer.

5. The hydrophilic polymer of invention 1, wherein the poly(meth)acrylamide-based copolymer comprises at least 80% by mole of (meth)acrylamide repeating units relative to all repeating units of the poly(meth)acrylamide-based copolymer.

6. The hydrophilic polymer of any one of inventions 1 to 5, wherein the poly(meth)acrylamide-based copolymer comprises at least about 50% by mole of the first repeating units relative to all repeating units of the poly(meth)acrylamide-based copolymer.

7. The hydrophilic polymer of any one of inventions 1 to 5, wherein the poly(meth)acrylamide-based copolymer comprises from about 50% to about 98% by mole of the first repeating units relative to all repeating units of the poly(meth)acrylamide-based copolymer.

8. The hydrophilic polymer of any one of inventions 1 to 5, wherein the poly(meth)acrylamide-based copolymer comprises from about 60% to about 95% by mole of the first repeating units relative to all repeating units of the poly(meth)acrylamide-based copolymer.

9. The hydrophilic polymer of any one of inventions 1 to 5, wherein the poly(meth)acrylamide-based copolymer comprises from about 70% to about 90% by mole of the first repeating units relative to all repeating units of the poly(meth)acrylamide-based copolymer.

10. The hydrophilic polymer of any one of inventions 1 to 9, wherein the poly(meth)acrylamide-based copolymer comprises from about 0.01% to about 40% by mole of the second repeating units relative to all repeating units of the poly(meth)acrylamide-based copolymer.

11. The hydrophilic polymer of any one of inventions 1 to 9, wherein the poly(meth)acrylamide-based copolymer comprises from about 0.1% to about 30% by mole of the second repeating units relative to all repeating units of the poly(meth)acrylamide-based copolymer.

12. The hydrophilic polymer of any one of inventions 1 to 9, wherein the poly(meth)acrylamide-based copolymer comprises from about 0.5% to about 20% by mole of the second repeating units relative to all repeating units of the poly(meth)acrylamide-based copolymer.

13. The hydrophilic polymer of any one of inventions 1 to 9, wherein the poly(meth)acrylamide-based copolymer comprises from about 1% to about 10% by mole of the second repeating units relative to all repeating units of the poly(meth)acrylamide-based copolymer.

14. The hydrophilic polymer of any one of inventions 1 to 13, wherein the second repeating units comprises (meth)acrylate repeating units each of which is a repeating unit of formula (2)

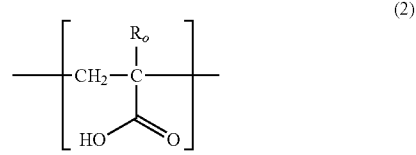

in which $R_o$ is hydrogen or methyl.

15. The hydrophilic polymer of any one of inventions 1 to 14, wherein the second repeating units comprises acrylic repeating units each of which is a repeating unit of formula (3)

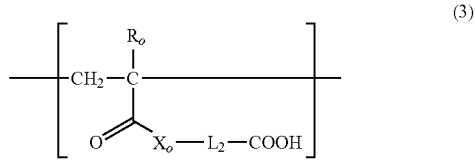

in which: $R_o$ is hydrogen or methyl; $X_o$ is —O— or —$NR_n$— in which $R_n$ is hydrogen or a $C_1$-$C_4$ alkyl group; $L_2$ is a $C_2$-$C_4$ alkylene divalent radical having 0 or 1 hydroxyl group.

16. The hydrophilic polymer of any one of inventions 1 to 15, wherein the second repeating units comprises acrylic repeating units each of which is a repeating unit of formula (5)

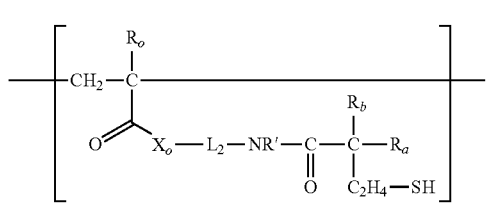
(5)

in which: $R_o$ is hydrogen or methyl; $X_o$ is —O— or —$NR_n$— in which $R_n$ is hydrogen or a $C_1$-$C_4$ alkyl group; $L_2$ is a $C_2$-$C_4$ alkylene divalent radical having 0 or 1 hydroxyl group; R' is hydrogen or a $C_1$-$C_4$ alkyl group; $R_a$ is hydrogen or methyl; $R_b$ is hydrogen, $C_1$-$C_3$ alkyl, acetyl, acetylamino, propionylamino, or butyrylamino.

17. The hydrophilic polymer of any one of inventions 1 to 16, wherein the second repeating units comprises acrylic repeating units each of which is a repeating unit of formula (6)

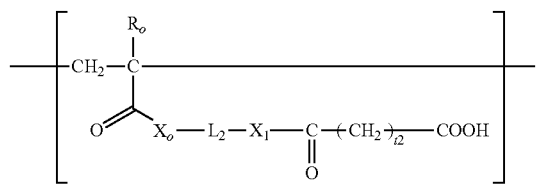
(6)

in which: $R_o$ is hydrogen or methyl; $X_o$ and $X_1$ independent of each other are —O— or —$NR_n$— in which $R_n$ is hydrogen or a $C_1$-$C_4$ alkyl group; $L_2$ is a $C_2$-$C_4$ alkylene divalent radical having 0 or 1 hydroxyl group; t2 is an integer of 2 to 4.

18. The hydrophilic polymer of any one of inventions 1 to 17, wherein the second repeating units comprises acrylic repeating units each of which is a repeating unit of formula (7)

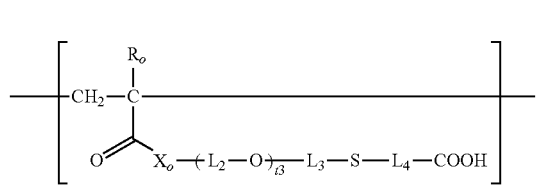
(7)

in which: $R_o$ is hydrogen or methyl; $X_o$ is —O— or —$NR_n$— in which $R_n$ is hydrogen or a $C_1$-$C_4$ alkyl group; $L_2$ and $L_4$ independent of each other are a $C_2$-$C_4$ alkylene divalent radical having 0 or 1 hydroxyl group; $L_3$ is —$CH_2$—CHOH—$CH_2$—; and t3 is 0 or 1.

19. The hydrophilic polymer of any one of inventions 1 to 19, wherein the second repeating units comprises acrylic repeating units each of which is a repeating unit of formula (9)

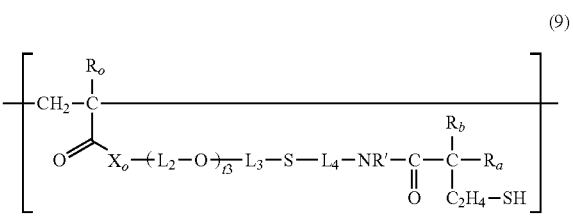
(9)

in which: $R_o$ is hydrogen or methyl; $X_o$ is —O— or —$NR_n$— in which $R_n$ is hydrogen or a $C_1$-$C_4$ alkyl group; $L_2$ and $L_4$ independent of each other are a $C_2$-$C_4$ alkylene divalent radical having 0 or 1 hydroxyl group; $L_3$ is —$CH_2$—CHOH—$CH_2$—; R' is hydrogen or a $C_1$-$C_4$ alkyl group; $R_a$ is hydrogen or methyl; $R_b$ is hydrogen, $C_1$-$C_3$ alkyl, acetyl, acetylamino, propionylamino, or butyrylamino; and t3 is 0 or 1.

20. The hydrophilic polymer of any one of inventions 1 to 19, wherein the second repeating units comprises acrylic repeating units each of which is a repeating unit of formula (10)

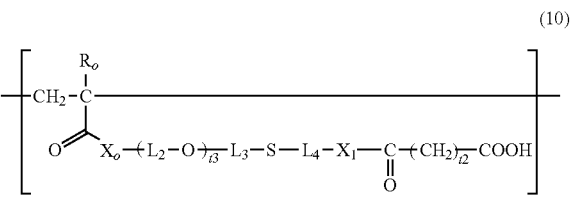
(10)

in which: $R_o$ is hydrogen or methyl; $X_o$ is —O— or preferably —$NR_n$— in which $R_n$ is hydrogen or a $C_1$-$C_4$ alkyl group; $L_2$ and $L_4$ independent of each other are a $C_2$-$C_4$ alkylene divalent radical having 0 or 1 hydroxyl group; $L_3$ is —$CH_2$—CHOH—$CH_2$—; R' is hydrogen or a $C_1$-$C_4$ alkyl; and t2 is an integer of 2 to 4.

21. The hydrophilic polymer of any one of inventions 1 to 20, wherein the second repeating units comprises acrylic repeating units each of which is a repeating unit of formula (11)

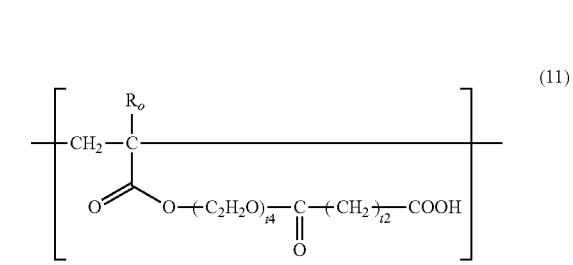
(11)

in which $R_o$ is hydrogen or methyl, t2 is an integer of 2 to 4, t4 is 0 or 1.

22. The hydrophilic polymer of any one of inventions 1 to 21, wherein the second repeating units comprises acrylic repeating units each of which is a repeating unit of formula (4)

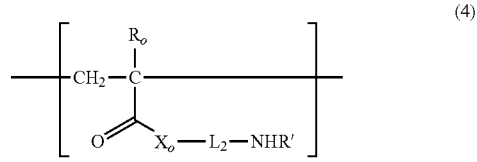

(4)

in which: $R_o$ is hydrogen or methyl; $X_o$ is —O— or —$NR_n$— in which $R_n$ is hydrogen or a $C_1$-$C_4$ alkyl group; $L_2$ is a $C_2$-$C_4$ alkylene divalent radical having 0 or 1 hydroxyl group; R' is hydrogen or a $C_1$-$C_4$ alkyl group.

23. The hydrophilic polymer of any one of inventions 1 to 22, wherein the second repeating units comprises acrylic repeating units each of which is a repeating unit of formula (8)

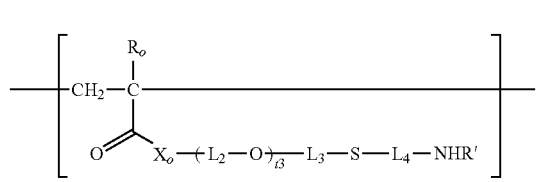

(8)

in which: $R_o$ is hydrogen or methyl; $X_o$ is —O— or —$NR_n$— in which $R_n$ is hydrogen or a $C_1$-$C_4$ alkyl group; $L_2$ and $L_4$ independent of each other are a $C_2$-$C_4$ alkylene divalent radical having 0 or 1 hydroxyl group; $L_3$ is —$CH_2$—CHOH—$CH_2$—; R' is hydrogen or a $C_1$-$C_4$ alkyl group; and t3 is 0 or 1.

24. The hydrophilic polymer of any one of inventions 15 to 23, wherein, in formula (3) to (10), $X_o$ is —$NR_n$— in which $R_n$ is hydrogen or a $C_1$-$C_4$ alkyl group.

25. The hydrophilic polymer of any one of inventions 1 to 24, wherein the poly(meth)acrylamide-based copolymer further comprises third repeating units which are acrylic repeating units of one or more acrylic monomers which are free of any carboxyl group or any primary or secondary amino group.

26. The hydrophilic polymer of invention 25, wherein said one or more acrylic monomers are selected from the group consisting of 2-(meth)acryloyloxy)ethyl-2'-(trimethylammonio)ethylphosphate, 3-((meth)acryloyloxy)propyl-2'-(trimethylammonio)ethylphosphate, 4-((meth)acryloyloxy)butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, 2-hydroxyethyl (meth)acrylate, glycerol (meth)acrylate, hydroxypropyl (meth)acrylate, $C_1$-$C_4$-alkoxy polyethylene glycol (meth)acrylate having a weight average molecular weight of up to 1500 Daltons, N,N-dimethylaminoethyl (meth)acrylate, N-vinylpyrrolidone (NVP), N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, allyl alcohol, vinyl alcohol, and combinations thereof.

27. The hydrophilic polymer of invention 25, wherein said one or more acrylic monomers are selected from the group consisting of 2-(meth)acryloyloxy)ethyl-2'-(trimethylammonio)ethylphosphate, 3-((meth)acryloyloxy)propyl-2'-(trimethylammonio)ethylphosphate, 4-((meth)acryloyloxy)butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethyl phosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, 2-hydroxyethyl (meth)acrylate, glycerol (meth)acrylate, hydroxypropyl (meth)acrylate, $C_1$-$C_4$-alkoxy polyethylene glycol (meth)acrylate having a weight average molecular weight of up to 1500 Daltons, and combinations thereof.

28. The hydrophilic polymer of invention 25, wherein said one or more acrylic monomers are selected from the group consisting of (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, and combinations thereof.

29. The wherein the poly(meth)acrylamide-based copolymer has a weight average molecular weight of from about 500 to about 2,000,000 (preferably from about 1,000 to about 1,000,000, more preferably from about 2,000 to about 500,000) Daltons.

30. A water-soluble thermally-crosslinkable polymeric material, comprising:
(a) one or more first polymer chain of an azetidinium-containing polymer having azetidinium groups;

(b) one or more second polymer chains of a poly(meth) acrylamide-based copolymer of any one of inventions 1 to 29, wherein each second polymer chain is covalently attached to one of said one or more first polymer chains via at least one linkage formed between one azetidinium group of the azetidinium-containing polymer and one reactive pendant group or chain of the poly(meth)acrylamide-based copolymer; and (c) azetidinium groups each of which is embedded in or covalently attached to one of said one or more first polymer chains.

31. The water-soluble thermally-crosslinkable polymeric material of invention 30, wherein the azetidinium-containing polymer is polyamidoamine-epichlorohydrin (PAE).

32. The water-soluble thermally-crosslinkable polymeric material of invention 30, wherein the azetidinium-containing polymer is a poly(2-oxazoline-co-ethyleneimine)-epichlorohydrin.

33. The water-soluble thermally-crosslinkable polymeric material of invention 30, wherein the azetidinium-containing polymer is a homopolymer of an azetidinium-containing vinylic monomer.

34. The water-soluble thermally-crosslinkable polymeric material of invention 30, wherein the azetidinium-containing polymer is a copolymer of an azetidinium-containing vinylic monomer with one or more hydrophilic vinylic monomers.

35. The water-soluble thermally-crosslinkable polymeric material of any one of inventions 30 to 34, wherein the water-soluble thermally-crosslinkable polymeric material comprises (i) from about 20% to about 95% by weight of the first polymer chains and (ii) from about 5% to about 80% by weight of the second polymer chains.

36. A packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of any one of inventions 29 to 34, wherein the packaging solution has a tonicity of from about 200 to about 450 milliosmol (mOsm) and a viscosity of from about 1 centipoise to about 20 centipoises at 25° C.

37. The packaging solution of invention 36, wherein the aqueous solution comprises from about 0.05% to about 1.5% by weight of the water-soluble thermally-crosslinkable hydrophilic polymeric material.

38. The packaging solution of invention 36, wherein the aqueous solution comprises from about 0.1% to about 1% by weight of the water-soluble thermally-crosslinkable hydrophilic polymeric material.

39. The packaging solution of invention 36, wherein the aqueous solution comprises from about 0.2% to about 0.5% by weight of the water-soluble thermally-crosslinkable hydrophilic polymeric material.

40. The packaging solution of any one of inventions 36 to 39, wherein the buffering agents are present in a packaging solution in an amount of from 0.01% to 0.8% (preferably from about 0.02% to about 0.4%) by weight.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

A copolymer of 2-(methacryloylamino)ethyl-2'-(trimethylammonio)ethyl phosphate (HEMAm-PC, CAS #179953-15-2) and N-(3-aminopropyl)methacrylamide hydrochloride (APMAm, CAS #72607-53-5) is prepared from a reactive mixture of 28.90 g of HEMAm-PC, 1.114 g of APMAm, 0.0287 g of 2-mercaptoethanol, 0.0683 g of Vazo-56, and 270.0 g of deionized (D.I.) water. The APMAm is dissolved in 15 g of D.I. water. The undissolved particles are removed by filtration through a 5 µm nylon syringe filter. The HEMAm-PC is dissolved in 60 g of D.I. water. The Vazo-56 is dissolved in 5 grams of D.I. water. All solutions are added into a 1 L jacketed reactor. The solution is degassed using nitrogen delivered through a fine glass frit at 200 mL/min. for 30 minutes. The polymerization is conducted by heating the solution under a positive pressure of nitrogen from 20° C. to 61.5° C. over 2 hours, followed by holding at 61.5° C. for 8 hours, then cooling to 20° C. over 2 hours. The molecular weight is determined by GPC using a light scattering detector (Mw=70 kDa and Mn=40 kDa).

All the publications and patents which have been cited herein above are hereby incorporated by reference in their entireties.

What is claimed is:

1. A poly(meth)acrylamide-based copolymer comprising:
first repeating units each of which is a (meth)acrylamide repeating unit of formula (1)

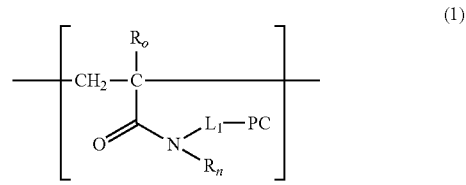

in which $R_0$ is hydrogen or methyl, $R_n$ is hydrogen or a $C_1$-$C_4$ alkyl group, $L_1$ is a $C_2$-$C_4$ alkylene divalent radical, PC is a monovalent radical of

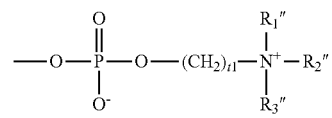

in which t1 is an integer of 1 to 5 and $R_1''$, $R_2''$ and $R_3''$ independently of one another are $C_1$-$C_4$ alkyl or $C_1$-$C_4$ hydroxyalkyl; and second repeating units which are acrylic repeating units each having a reactive pendant group or chain which comprises a carboxyl group, a thiol group or an amino group of —NHR' in which R' is hydrogen or a $C_1$-$C_4$ alkyl group, wherein the poly(meth)acrylamide-based copolymer comprises at least 50% by mole of all (meth)acrylamide repeating units relative to all repeating units of the poly(meth)acrylamide-based copolymer.

2. The poly(meth)acrylamide-based copolymer of claim 1, wherein the poly(meth)acrylamide-based copolymer comprises at least about 50% by mole of the first repeating units relative to all repeating units of the poly(meth)acrylamide-based copolymer.

3. The poly(meth)acrylamide-based copolymer of claim 2, wherein the poly(meth)acrylamide-based copolymer comprises from about 0.01% to about 40% by mole by mole of the second repeating units relative to all repeating units of the poly(meth)acrylamide-based copolymer.

4. The poly(meth)acrylamide-based copolymer of claim 3, wherein the second repeating units comprises (meth)acrylate repeating units each of which is a repeating unit of any one of formula (2) to (11)

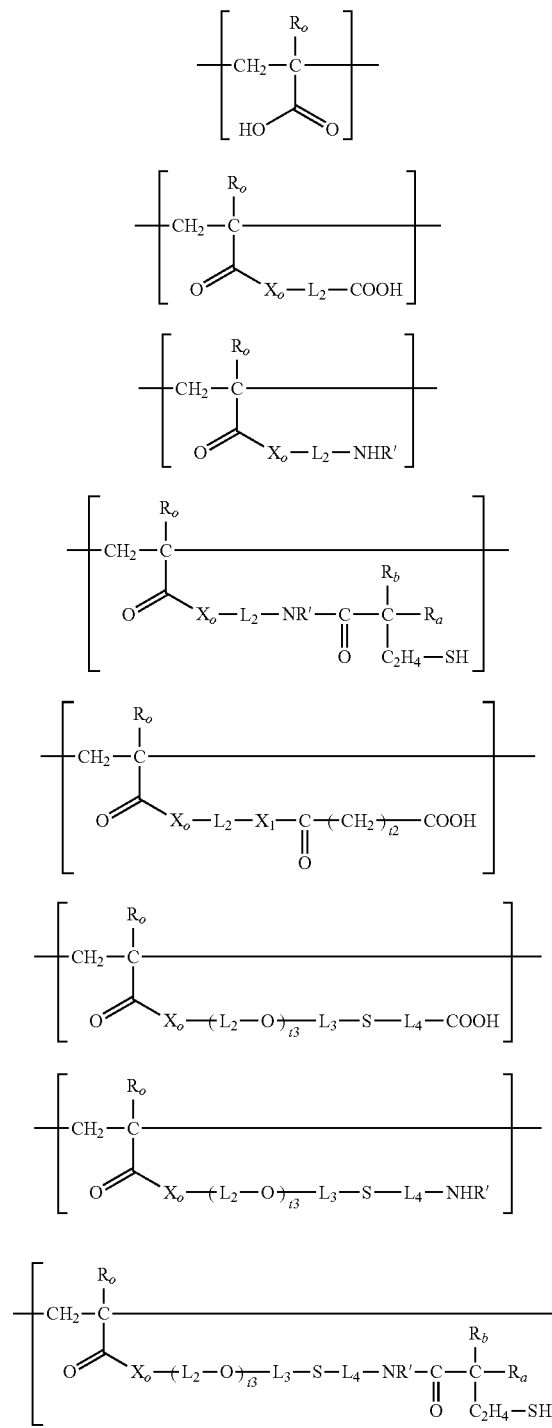

-continued

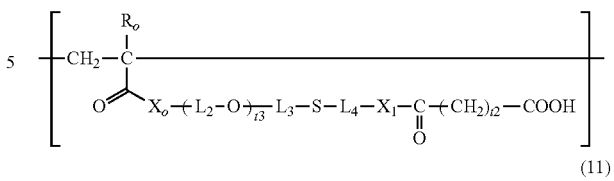

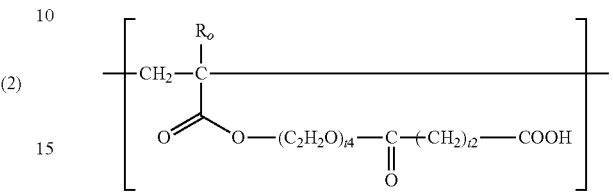

in which $R_0$ is hydrogen or methyl, $X_0$ and $X_1$ independent of each other are —O— or —$NR_n$— in which $R_n$ is hydrogen or a $C_1$-$C_4$ alkyl group, $L_2$ and $L_4$ independent of each other are a $C_2$-$C_4$ alkylene divalent radical having 0 or 1 hydroxyl group, $L_3$ is —$CH_2$—CHOH—$CH_2$—, R' is hydrogen or a $C_1$-$C_4$ alkyl group, $R_a$ is hydrogen or methyl, and $R_b$ is hydrogen, $C_1$-$C_3$ alkyl, acetyl, or $C_2$-$C_4$ alkanoylamino which optionally has a carboxyl group, t2 is an integer of 2 to 4, t3 and t4 independent of each other are 0 or 1.

5. The poly(meth)acrylamide-based copolymer of claim 4, wherein, in formula (3) to (10), $X_0$ is —$NR_n$— in which $R_n$ is hydrogen or a $C_1$-$C_4$ alkyl group.

6. The poly(meth)acrylamide-based copolymer of claim 5, wherein the poly(meth)acrylamide-based copolymer further comprises third repeating units which are acrylic repeating units of one or more acrylic monomers which are free of any carboxyl group or any primary or secondary amino group.

7. The poly(meth)acrylamide-based copolymer of claim 6, wherein the third repeating units are selected from the group consisting of 2-(meth)acryloyloxy)ethyl-2'-(trimethylammonio)ethylphosphate, 3-((meth)acryloyloxy)propyl-2'-(trimethylammonio)ethylphosphate, 4-((meth)acryloyloxy)butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, (meth)acrylamide, N,N-dimethyl (meth)acrylamide, N-2-hydroxyethyl (meth)acrylamide, N-3-hydroxypropyl (meth)acrylamide, N-2-hydroxypropyl (meth)acrylamide, N-4-hydroxybutyl (meth)acrylamide, N-5-hydroxypentyl (meth)acrylamide, N-6-hydroxyhexyl (meth)acrylamide, N-(2,3-dihydroxypropyl) (meth)acrylamide, N,N-bis(2-hydroxyethyl) (meth)acrylamide, N-tris(hydroxymethyl)methyl (meth)acrylamide, N,N-dimethylaminopropyl (meth)acrylamide, 2-hydroxyethyl (meth)acrylate, glycerol (meth)acrylate, hydroxypropyl (meth)acrylate, $C_1$-$C_4$-alkoxy polyethylene glycol (meth)acrylate having a weight average molecular weight of up to 1500 Daltons, N,N-dimethylaminoethyl (meth)acrylate, N-vinylpyrrolidone (NVP), N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, allyl alcohol, vinyl alcohol, and combinations thereof.

8. A water-soluble thermally-crosslinkable polymeric material, comprising:
   (a) one or more first polymer chain of an azetidinium-containing polymer having azetidinium groups;
   (b) one or more second polymer chains of a poly(meth)acrylamide-based copolymer of claim 1, wherein each second polymer chain is covalently attached to one of said one or more first polymer chains via at least one linkage formed between one azetidinium group of the azetidinium-containing polymer and one reactive pendant group or chain of the poly(meth)acrylamide-based copolymer; and
   (c) azetidinium groups each of which is embedded in or covalently attached to one of said one or more first polymer chains.

9. The water-soluble thermally-crossklinkable polymeric material of claim 8, wherein the azetidinium-containing polymer is polyamidoamine-epichlorohydrin (PAE).

10. The water-soluble thermally-crosslinkable polymeric material of claim 8, wherein the azetidinium-containing polymer is a poly(2-oxazoline-co-ethyleneimine)-epichlorohydrin.

11. The water-soluble thermally-crosslinkable polymeric material of claim 8, wherein the azetidinium-containing polymer is a homopolymer of an azetidinium-containing vinylic monomer.

12. The water-soluble thermally-crosslinkable polymeric material of claim 8, wherein the azetidinium-containing polymer is a copolymer of an azetidinium-containing vinylic monomer with one or more hydrophilic vinylic monomers.

13. The water-soluble thermally-crosslinkable polymeric material of claim 8, wherein the water-soluble thermally-crosslinkable polymeric material comprises (i) from about 20% to about 95% by weight of the first polymer chains and (ii) from about 5% to about 80% by weight of the second polymer chains.

14. A packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of claim 8, wherein the packaging solution has a tonicity of from about 200 to about 450 milliosmol (mOsm) and a viscosity of from about 1 centipoise to about 20 centipoises at 25° C.

15. The packaging solution of claim 14, wherein the aqueous solution comprises from about 0.05% to about 1.5% by weight of the water-soluble thermally-crosslinkable hydrophilic polymeric material.

* * * * *